United States Patent
Jhu et al.

(10) Patent No.: US 8,493,365 B2
(45) Date of Patent: Jul. 23, 2013

(54) OPTICAL TOUCH DISPLAY APPARATUS

(75) Inventors: Yu-Lun Jhu, Hsin-Chu (TW);
Chen-Lung Chen, Hsin-Chu (TW);
Chwen-Tay Hwang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 249 days.

(21) Appl. No.: 12/955,918

(22) Filed: Nov. 30, 2010

(65) Prior Publication Data
US 2011/0148818 A1    Jun. 23, 2011

(30) Foreign Application Priority Data

Dec. 22, 2009 (TW) .............................. 98144310 A

(51) Int. Cl.
*G06F 3/042* (2006.01)
*G06F 3/041* (2006.01)
*G06K 11/06* (2006.01)

(52) U.S. Cl.
USPC ........ 345/176; 345/173; 345/175; 178/18.09; 178/18.11

(58) Field of Classification Search
USPC ................. 345/156–158, 168–176, 179–180; 178/18.09, 18.11, 19.05; 463/37
See application file for complete search history.

(56) References Cited

U.S. PATENT DOCUMENTS

| 6,690,363 | B2 | 2/2004 | Newton | |
|---|---|---|---|---|
| 6,836,367 | B2 | 12/2004 | Seino et al. | |
| 7,515,143 | B2* | 4/2009 | Keam et al. | 345/175 |
| 2006/0192755 | A1* | 8/2006 | Blythe et al. | 345/158 |
| 2008/0122803 | A1* | 5/2008 | Izadi et al. | 345/175 |
| 2011/0115747 | A1* | 5/2011 | Powell et al. | 345/175 |

FOREIGN PATENT DOCUMENTS

| TW | M358363 | 6/2009 |
|---|---|---|
| TW | M368847 | 11/2009 |
| WO | 2009081810 | 7/2009 |
| WO | 2009093388 | 7/2009 |
| WO | 2009104667 | 8/2009 |
| WO | 2009110293 | 9/2009 |
| WO | 2009110294 | 9/2009 |

* cited by examiner

*Primary Examiner* — Lun-Yi Lao
*Assistant Examiner* — Jarurat Suteerawongsa
(74) *Attorney, Agent, or Firm* — Jianq Chyun IP Office

(57) ABSTRACT

An optical touch display apparatus includes the following. A light distribution adjustment device is disposed in a transmission path of a visible beam emitted by a visible light emitting device. A non-visible light guide module includes a light guide unit and a dichroic unit. A light guide unit is disposed in the transmission path of the visible beam from the light distribution adjustment device. The dichroic unit is disposed on a surface of the light guide unit. A non-visible light emitting device is disposed beside a side surface of the light guide unit. A display panel is disposed beside the light distribution adjustment device. A sensing space is located in front of the display panel, and the display panel is disposed between the light distribution adjustment device and the sensing space. An optical detector is disposed outside the display panel.

19 Claims, 6 Drawing Sheets

OPTICAL TOUCH DISPLAY APPARATUS

CROSS-REFERENCE TO RELATED APPLICATION

This application claims the priority benefit of Taiwan application serial no. 98144310, filed on Dec. 22, 2009. The entirety of the above-mentioned patent application is hereby incorporated by reference herein and made a part of this specification.

BACKGROUND OF THE INVENTION

1. Field of the Invention

The invention is related to a touch display apparatus, and in particular, to an optical touch display apparatus.

2. Description of Related Art

With the rapid advancement of optoelectronic technologies, a user may no longer be satisfied with the use of a mouse to control a computer and objects on a screen. Accordingly, interfaces more user-friendly than the mouse have been gradually developed. Among these user-friendly interfaces, the touch control method by using fingers is closest to human experiences in the daily life. In particular, elders and children who may be incapable of using the mouse nimbly may touch with their fingers easily. This has been partially proved by the adoption of touch screens in some automatic teller machines.

Additionally, if a mouse is not externally connected to a conventional laptop computer, the cursor is controlled through the track pad and track point beside the keys. For a general user, however, the track pad or track point beside the keys may not be controlled as nimbly as the mouse, whereas a touch device disposed on the screen may solve such a problem. Since the control method of the touch device is a very intuitive control method, and the user directly touches the screen to control the objects. Hence, when the touch device is applied to the laptop computer, even if it is inconvenient for the user to externally connect the mouse, the user is still capable of agilely controlling the laptop computer through the touch device.

Currently, general touch devices may be classified into resistive types, capacitive types, optical types, acoustic wave types, and electromagnetic types. An optical touch display apparatus generally includes a display, an infrared light source, a light guide unit, a detector, and a processor, wherein the display includes a backlight module and a display panel. The infrared light source is disposed beside the display panel to generate an infrared beam capable of being detected by the detector after passing through the light guide unit. The processor determines the position of the touch object according to an intensity change in the infrared beam detected by the detector when a touch object contacts the panel. However, since the infrared light source and the light guide unit used to guide the infrared light are disposed on a front frame beside the display panel, the structure beside the display panel protrudes too much, thereby causing the appearance of the display to be inferior and lack a smooth and modernistic touch. Moreover, a plurality of sets of infrared light sources and light guide units are required, thereby causing increases in the number of optical components and costs, and assembly times are also lengthened.

SUMMARY OF THE INVENTION

The invention provides an optical touch display apparatus having at least one of the advantages of a superior appearance, lower costs, and easy assembly.

Other objects and advantages of the invention may be further illustrated by the technical features broadly embodied and described as follows.

An embodiment of the invention provides an optical touch display apparatus. The optical touch display apparatus includes at least one visible light emitting device, a light distribution adjustment device, a non-visible light guide module, at least one non-visible light emitting device, a display panel, and at least an optical detector. The visible light emitting device is capable of emitting a visible beam. The light distribution adjustment device is disposed in a transmission path of the visible beam. The non-visible light guide module includes a light guide unit and a dichroic unit. The light guide unit is disposed in the transmission path of the visible beam from the light distribution adjustment device, and has a first surface facing away from the light distribution adjustment device, a second surface facing the light distribution adjustment device, and a side surface connecting the first surface and the second surface. The dichroic unit is disposed on the second surface. The non-visible light emitting unit is disposed beside the side surface and is capable of emitting a non-visible beam. The non-visible beam is capable of entering the light guide unit through the side surface. The dichroic unit is capable of letting the visible beam pass through and reflecting the non-visible beam from the side surface to the first surface. The display panel is disposed beside the light distribution adjustment device. A sensing space is located in front of the display panel, and the display panel is located between the light distribution adjustment device and the sensing space. The light guide unit is disposed between the light distribution adjustment device and the sensing space, and the non-visible beam is capable of being transmitted through the first surface to the sensing space. The optical detector is disposed outside the display panel. A touch object reflects a portion of the non-visible beam when the touch object enters the sensing space. The optical detector is disposed in a transmission path of the portion of the non-visible beam reflected by the touch object.

In summary, the embodiment or the embodiments of the invention may have at least one of the following advantages. Since the optical touch display apparatus according to the embodiments of the invention adopts the non-visible light guide module disposed between the light distribution adjustment device and the sensing space to provide the non-visible light, the exterior of the optical touch display apparatus is more even and good-looking.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
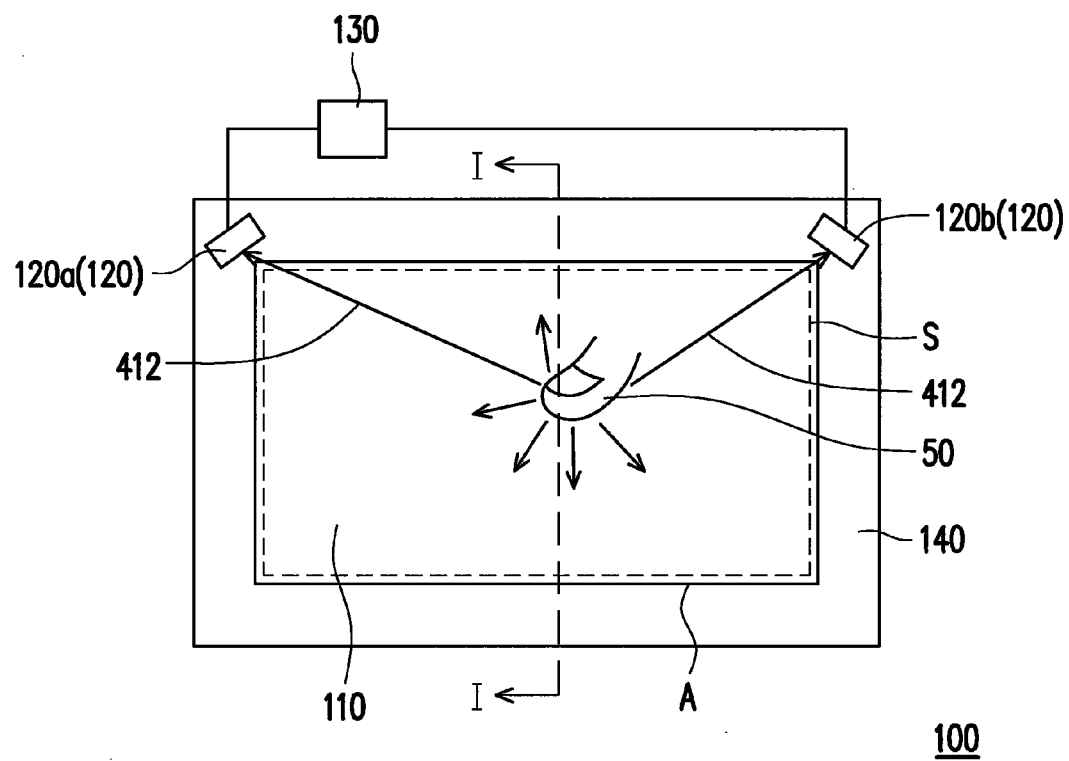
FIG. 1A is a schematic front view of an optical touch display apparatus according to an embodiment of the invention.
Figure 1B:
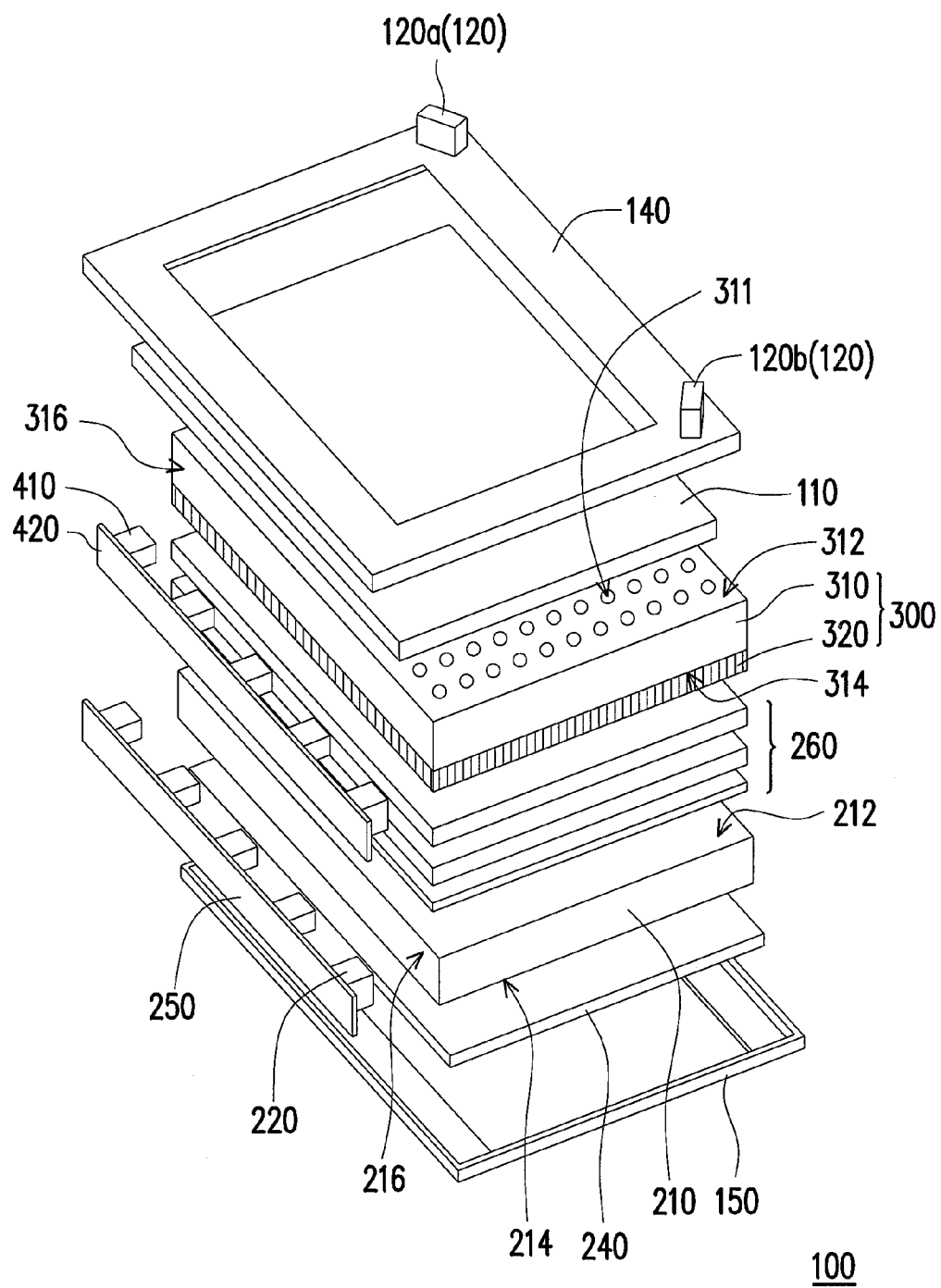
FIG. 1B is an explosive view of the optical touch display apparatus in FIG. 1A.
Figure 1C:
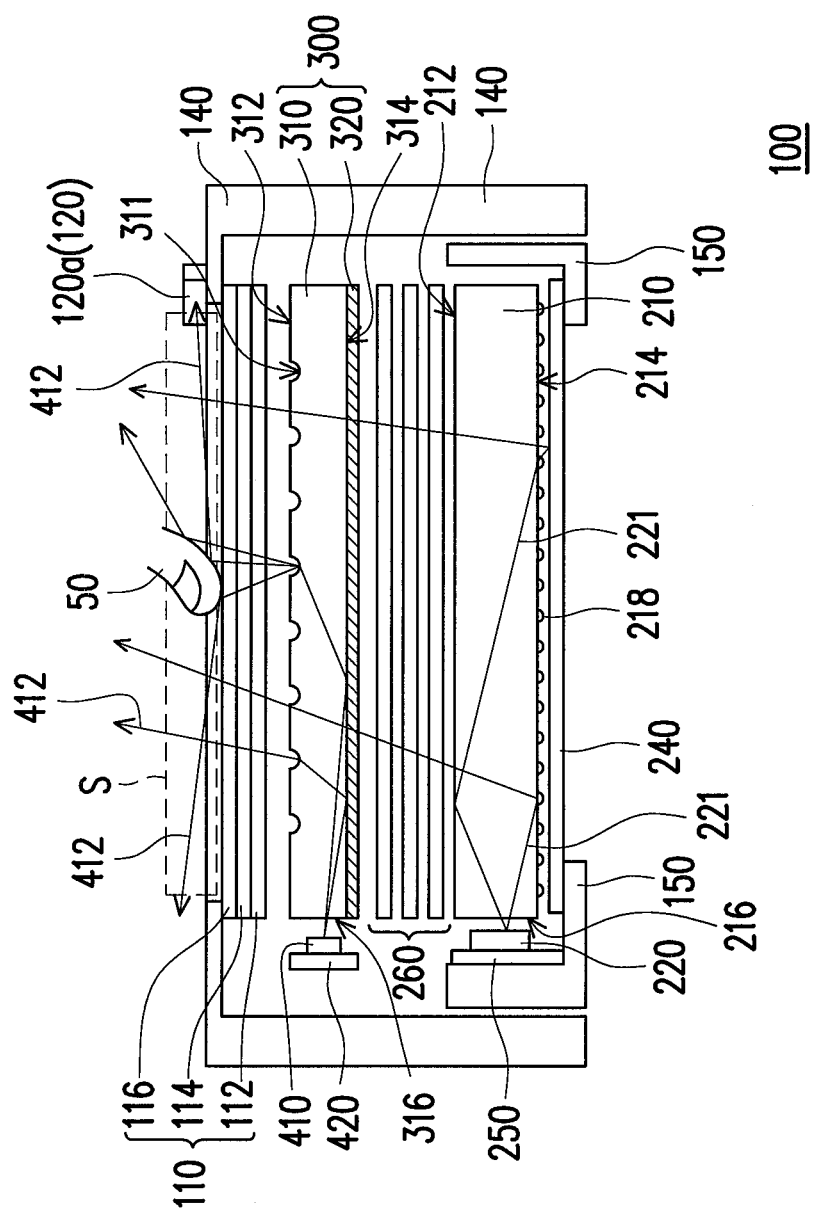
FIG. 1C is a schematic cross-sectional view of the optical touch display apparatus in FIG. 1A taken along line I-I.

Referring to FIGS. 1A to 1C, an optical touch display apparatus 100 according to the embodiment includes at least one visible light emitting device 220 (a plurality of visible light emitting devices 220 are exemplarily included in the embodiment), a light distribution adjustment device 210, a non-visible light guide module 300, at least one non-visible light emitting device 410 (a plurality of non-visible light emitting devices 410 are exemplarily included in the embodiment), a display panel 110, and at least one optical detector 120 (two optical detectors 120a and 120b are exemplarily included in the embodiment).

Each of the visible light emitting devices 220 is capable of emitting a visible beam 221 (as shown in FIG. 1C). The light distribution adjustment device 210 is disposed in a transmission path of the visible beam 221. According to the embodiment, the light distribution adjustment device 210 is, for example, a light guide plate and has a surface 212 facing the display panel 110, a surface 214 facing away from the display panel 110, and a light incident surface 216 connecting the surface 212 and the surface 214. Each of the visible light emitting devices 220 is disposed beside the light incident surface 216, and the visible beam 221 is capable of entering the light guide plate 210 through the light incident surface 216 and being transmitted to the display panel 110 through the surface 214. After the visible beam 221 is modulated by the display panel 110, a frame suitable for being viewed by the human eye is generated. According to the embodiment, the optical touch display apparatus 100 further includes a reflecting unit 240 disposed on the surface 214, so that the visible beam 221 from the light incident surface 216 is reflected to the surface 212. Each of the visible light emitting devices 220 is, for example, a visible light emitting diode (LED) and may be disposed on a carrier 250. The carrier 250 is, for example, a circuit board, and each of the visible light emitting devices 220 is electrically connected to the carrier 250.

The non-visible light guide module 300 includes a light guide unit 310 and a dichroic unit 320. The light guide unit 310 is disposed in the transmission path of the visible beam 221 from the light distribution adjustment device 210 and has a first surface 312 facing away from the light distribution adjustment device 210, a second surface 314 facing the light distribution adjustment device 210, and a side surface 316 connecting the first surface 312 and the second surface 314. According to the embodiment, the light guide unit 310 is, for example, a light guide plate. The dichroic unit 320 is disposed on the second surface 314. Each of the non-visible light emitting devices 410 is disposed beside the side surface 316 and is capable of emitting a non-visible beam 412. According to the embodiment, each of the non-visible light emitting devices 410 is, for example, an infrared LED, and the non-visible beam 412 is, for example, an infrared beam. The non-visible beam 412 is capable of entering the light guide unit 310 through the side surface 316. According to the embodiment, the non-visible light emitting device 410 may be disposed on a carrier 420, wherein the carrier 420 is, for example, a circuit board electrically connected to the non-visible light emitting devices 410. The dichroic unit 320 is capable of letting the visible beam 221 pass through and reflecting the non-visible beam 412 from the side surface 316 to the first surface 312. According to the embodiment, the dichroic unit 320 is, for example, a dichroic film capable of letting visible light pass through and reflecting infrared light.

The display panel 110 is disposed beside the light distribution adjustment device 210. A sensing space S is located in front of the display panel 110, and the display panel 110 is disposed between the light distribution adjustment device 210 and the sensing space S. According to the embodiment, the non-visible light guide module 300 is disposed between the light distribution adjustment device 210 and the display panel 110. However, according to another embodiment, the non-visible light guide module 300 may also be disposed between the display panel 110 and the sensing space S. According to the embodiment, the light guide unit 310 is disposed between the light distribution adjustment device 210 and the sensing space S, and the non-visible beam 412 is capable of being transmitted through the first surface 312 to the sensing space S. According to the embodiment, the non-visible light guide module 300 is disposed between the light distribution adjustment device 210 and the display panel 110. In addition, the light guide unit 310 may include a plurality of scattering microstructures 311 disposed on at least one of the first surface 312 and the second surface 314. The scattering microstructures 311 are, for example, dented dots, protruding dots, dented veins, protruding veins, or combinations thereof. As shown in FIG. 1C, for example, the scattering microstructures 311 are dented dots located on the first surface 312. According to the embodiment, when the non-visible beam 412 enters the light guide unit 310 through the side surface 316, the non-visible beam 412 is repeatedly reflected by the first surface 312 and the second surface 314. The scattering microstructures 311 are capable of disrupting the reflection, so that the non-visible beam 412 leaves the light guide unit 310 due to scattering and is transmitted to the display panel 110. Next, the non-visible beam 412 passes through the display panel 110 to the sensing space S.

According to the embodiment, the display panel 110 is, for example, a liquid crystal display panel, and the display panel 110 includes an active device array substrate 112, a liquid crystal layer 114, and an opposite substrate 116. The liquid crystal layer 114 is disposed between the active device array substrate 112 and the opposite substrate 116, and the opposite substrate 116 is disposed between the liquid crystal layer 114 and the sensing space S. According to the embodiment, the active device array substrate 112 is, for example, a thin film transistor (TFT) array substrate, and the opposite substrate 116 is, for example, a color filter array substrate.

The optical detectors 120 are disposed outside the display panel 110. According to the embodiment, each of the optical detectors 120 is disposed beside the sensing space S and is disposed beside a side of the display panel 110 facing away from the light distribution adjustment device 210. Additionally, according to the embodiment, the optical detectors 120a and 120b are disposed at two adjacent corners of a display area A of the display panel 110. Each of the optical detectors 120 is, for example, a complementary metal oxide semiconductor (CMOS) sensor, a charge coupled device (CCD), a photo multiplier tube (PMT), or another type of image sensor. When a touch object 50 (such as a finger of the user, a tip of a stylus, or another suitable object) enters the sensing space S, the touch object 50 reflects a portion of the non-visible beam 412. The optical detectors 120 are disposed in a transmission path of the portion of the non-visible beam 412 reflected by the touch object 50. Specifically, the non-visible beam 412 irradiated on the touch object 50 is scattered when the touch object 50 enters the sensing space S. Hence, the touch object 50 reflects the portion of the non-visible beam 412 to the optical detectors 120. The portion of the non-visible beam 412 generates a bright region on a frame detected by the optical detectors 120. The bright region is, for example, a bright spot.

Moreover, since in other portions of the sensing space S is not occupied by the touch object 50, and no object reflects the non-visible beam 412 to the optical detectors 120, so that a dark region (which is a dark background) is formed on the frame detected by the optical detectors 120. The optical touch display apparatus 100 is capable of determining the position of the touch object 50 in the sensing space S according to the position of the bright region of the frame. Specifically, the optical touch display apparatus 100 may further include a processing unit 130 electrically connected to the optical detectors 120. According to the embodiment, for example, the processing unit 130 is connected to both the optical detectors 120a and 120b. The optical touch display apparatus 130 is capable of determining the position of the touch object 50 in the sensing space S according to the position of the bright region of the frame.

According to the embodiment, the optical touch display apparatus 100 further includes an optical film set 260 disposed between the light distribution adjustment device 210 and the display panel 110. The optical film set 260 includes at least one of a brightness enhancement film (BEF), a prism sheet, and a diffusion sheet. In other words, the optical film set 260 includes any combination of a BEF, a prism sheet, a diffusion sheet, and other optical films. In addition, according to the embodiment, the non-visible light guide module 300 is disposed between the optical film set 260 and the display panel 110.

According to the embodiment, the optical touch display apparatus 100 further includes a front frame 140 covering an edge of the display panel 110. The optical detectors 120 are disposed on the front frame 140, and a portion of the front frame 140 is disposed between the optical detectors 120 and the edge of the display panel 110. Additionally, according to the embodiment, the optical detectors 120a and 120b are respectively disposed at two adjacent corners of the front frame 140. Moreover, according to the embodiment, the optical touch display apparatus 100 further includes a rear frame 150 used to house the carrier 250 and the reflecting unit 240.

The embodiments of the invention may have at least one of the following advantages. Since the optical touch display apparatus 100 according to the embodiment adopts the non-visible light guide module 300 disposed between the light distribution adjustment device 210 and the sensing space S to provide the non-visible light, the exterior of the optical touch display apparatus 100 according to the embodiment is more even and good-looking. In a conventional optical touch display apparatus, an infrared light source and a light guide unit used to guide infrared light are disposed on a front frame beside a display area, thereby causing a structure beside the display area to protrude too much. On the contrary, the optical touch display apparatus 100 according to the embodiment prevents the above problem. Moreover, the conventional optical touch display apparatus usually requires a plurality of sets of infrared light sources and light guide units, so that the number of optical components and costs are increased, and the assembly times are lengthened. According to the embodiment, the non-visible light guide module 300 is combined into the optical touch display apparatus 100, so that the optical structure is simplified, thereby reducing the difficulty in assembly, assembly times and the costs.

Notably, the visible light emitting device 220 in the invention is not necessarily limited to LEDs. According to other embodiments, the visible light emitting devices 220 may also be fluorescent light tubes, incandescent light bulbs, halogen light bulbs, or other suitable light emitting devices.

Figure 2:
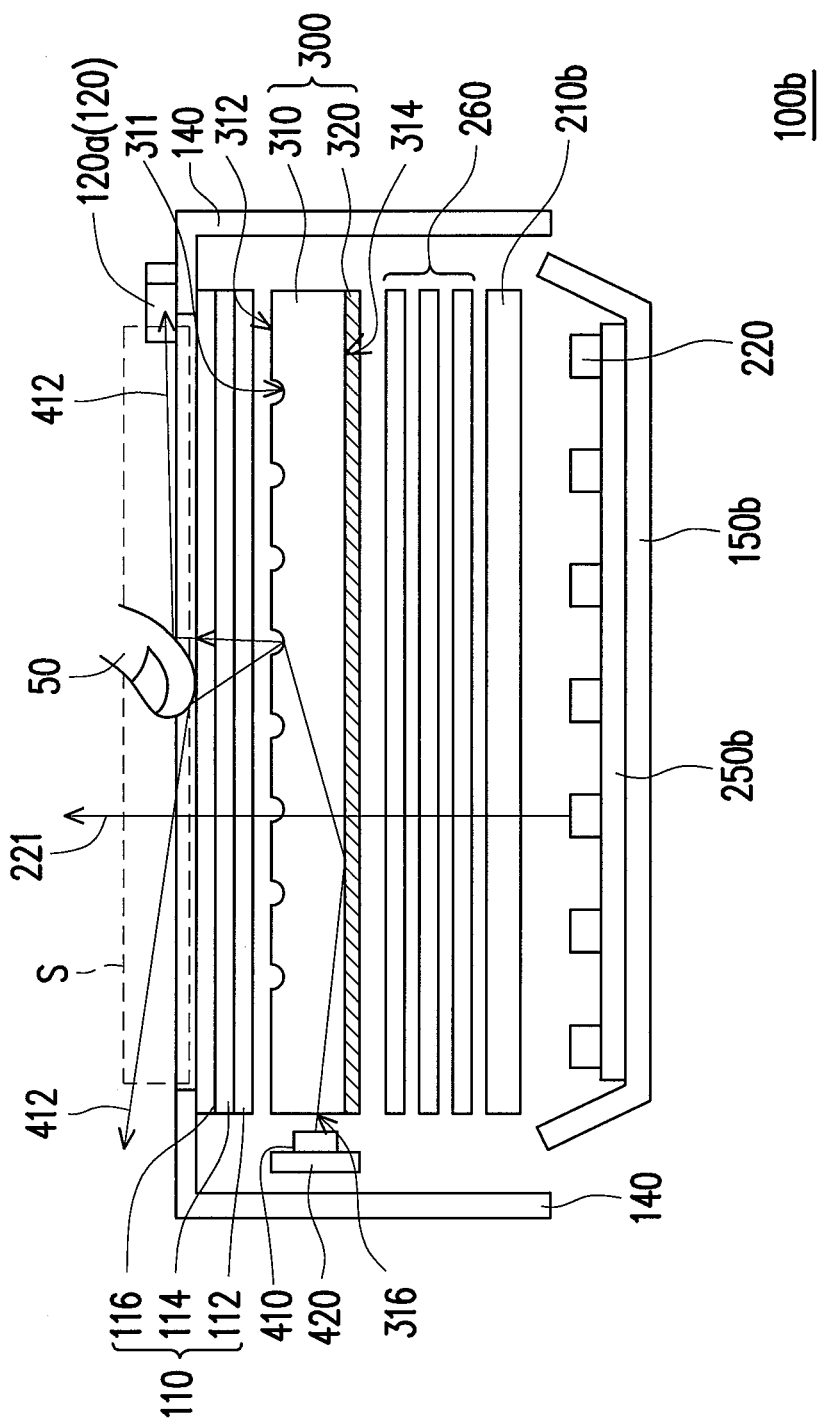
FIG. 2 is a schematic cross-sectional view of an optical touch display apparatus according to another embodiment of the invention.

Referring to FIG. 2, an optical touch display apparatus 100b according to the embodiment is similar to the optical touch display apparatus 100 in FIG. 1C. The difference between the optical touch display apparatus 100b and the optical touch display apparatus 100 is described below. In the optical touch display apparatus 100b according to the embodiment, a light distribution adjustment device 210b is a diffusion plate. In addition, the light distribution adjustment device 210b is disposed between each of the visible light emitting devices 220 and the display panel 110, wherein the visible beam 221 is capable of being transmitted to the display panel 110 through the light distribution adjustment device 210b. According to the embodiment, the visible light emitting devices 220 may be arranged in a two-dimensional array on a carrier 250b, and a rear frame 150b is used to house the carrier 250b and the visible light emitting devices 220. The optical touch display apparatus 100b according to this embodiment is capable of achieving the same advantages and effects of the optical touch display apparatus 100 in FIG. 1C, so that the advantages and effects are not repeatedly described.

Figure 3:
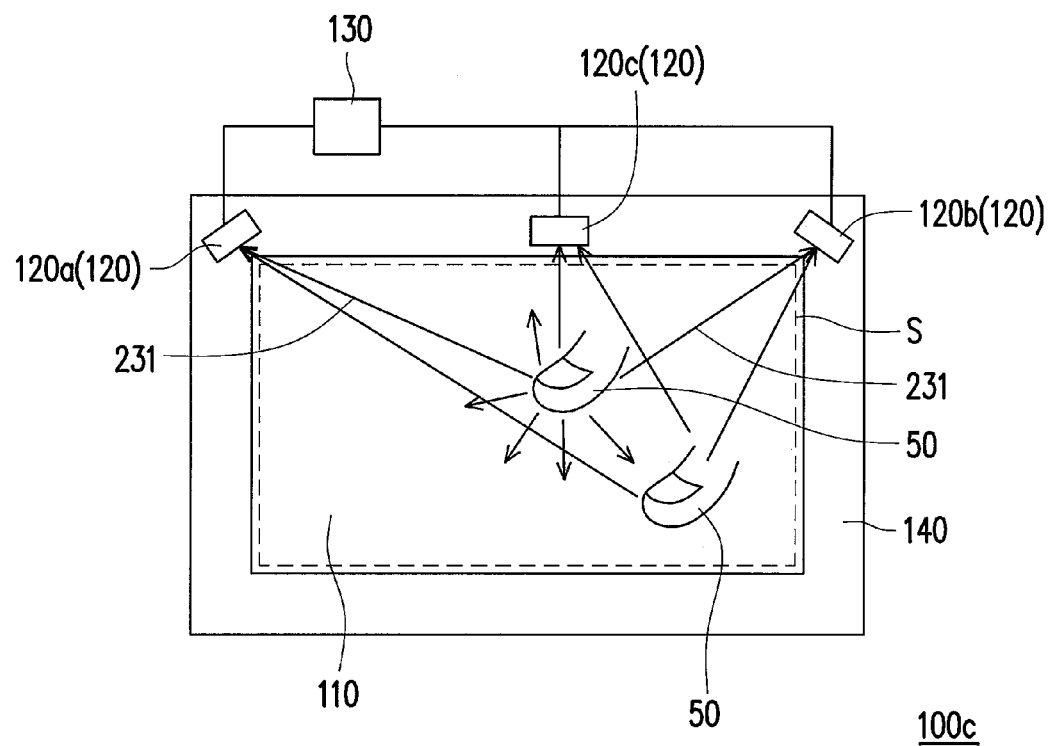
FIG. 3 is a schematic front view of an optical touch display apparatus according to another embodiment of the invention.

Referring to FIG. 3, an optical touch display apparatus 100c according to the embodiment is similar to the optical touch display apparatus 100 in FIG. 1A. The difference between the optical touch display apparatus 100c and the optical touch display apparatus 100 is described below. According to the embodiment, the optical touch display apparatus 100c includes three optical detectors 120, which are optical detectors 120a, 120b, and 120c. According to the embodiment, the optical detector 120c is disposed on a side of the front frame 140. However, according to other embodiments, the optical detector 120c may also be disposed on another corner or side of the front frame 140. Since the optical touch display apparatus 100 has three optical detectors 120, even if two touch objects 50 simultaneously enter the sensing space S, the processing unit 130 is capable of determining the respective positions of the two touch objects 50, thereby enabling accurate touch control by multiple touch points through the optical touch display apparatus 100c.

Notably, in the invention, the number of the optical detectors 120 of the optical touch display apparatus 100c are not limited. The optical touch display apparatus is capable of achieving touch control by even more touch points when the number of the optical detectors 120 is greater. In addition, when there is only one optical touch detector 120, the costs of the optical display apparatus are effectively lowered. According to an embodiment, only one optical detector 120 is sufficient for detecting the one-dimensional change of the position of the touch object, so that the arrangement is applied to an optical touch display apparatus required simple touch functions, such as the screen of an automatic teller machine.

Figure 4:
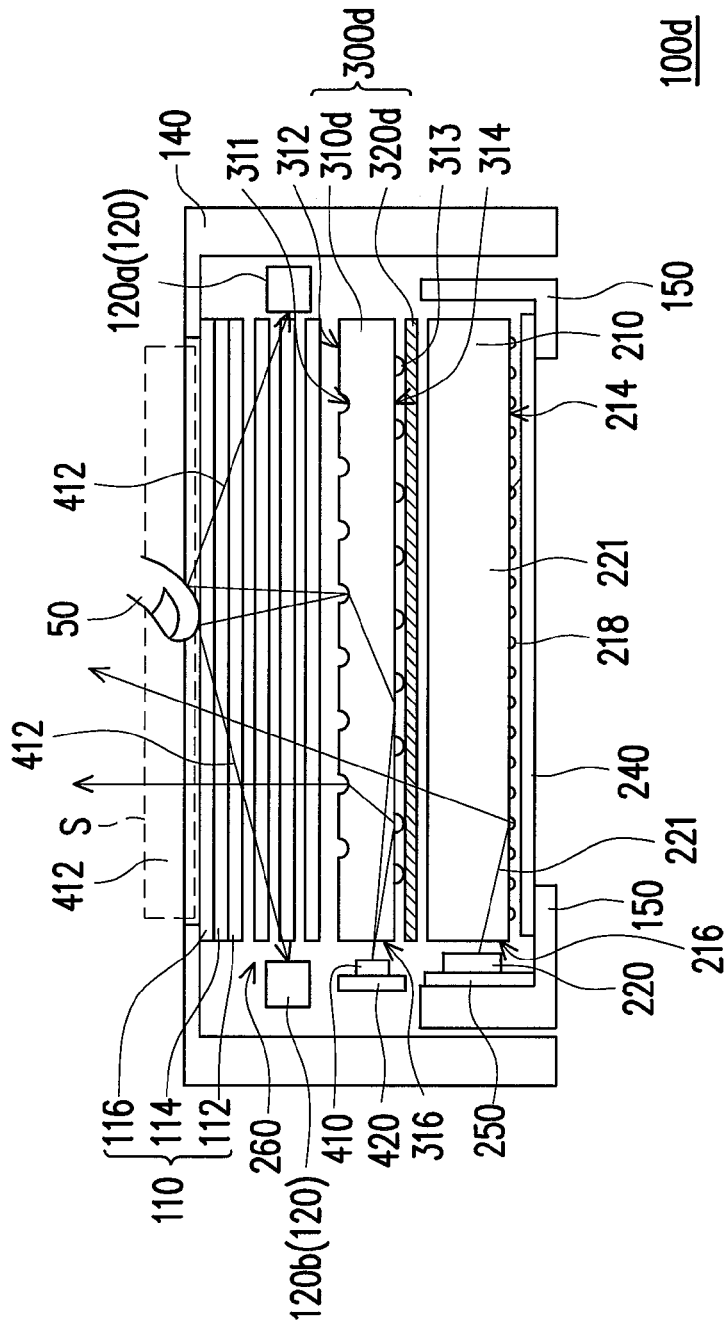
FIG. 4 is a schematic cross-sectional view of an optical touch display apparatus according to another embodiment of the invention.

Referring to FIG. 4, an optical touch display apparatus 100d of the embodiment is similar to the optical touch display apparatus 100 in FIG. 1B. The difference between the optical touch display apparatus 100d and the optical touch display apparatus 100 lies in the positions of the optical detectors 120. In the optical touch display apparatus 100d according to the embodiment, the optical detectors 120 (for example the optical detectors 120a and the optical detector 120b) are disposed beside a side of the display panel 110 facing the light distribution adjustment device 210. According to the embodiment, the optical detectors 120a and 120b are disposed beside a side of a non-visible light guide module 300d facing the display panel 110. A portion of the non-visible beam 412 reflected by the touch object 50 is transmitted to the optical detectors 120a and 120b through the display panel 110. According to the embodiment, since the optical detectors 120 are disposed inside the optical touch display apparatus 100d instead of on the front frame 140, the exterior of the optical touch display apparatus 100d is further beautified, and the overall thickness of the optical touch display apparatus 100d is reduced.

In addition, according to the embodiment, the non-visible light guide module 300d is disposed between the light distribution adjustment device 210 and the optical film set 260. The invention, however, is not limited to this arrangement. According to other embodiments, the non-visible light guide module 300d may also be disposed between the optical film set 260 and the display panel 110, between the display panel 110 and the sensing space S, or between the display panel 110 and a portion of the front frame 140.

Furthermore, according to the embodiment, the dichroic unit 320d is, for example, a dichroic mirror. In addition, a plurality of scattering microstructures 313 may be disposed on the second surface 314 of the light guide unit 310d, and the scattering microstructures 313 are, for example, protruding dots. However, according to other embodiments, the scattering microstructures 313 may also be dented dots, protruding veins, or dented veins.

In summary, the embodiment or embodiments of the invention may have at least one of the following advantages. Since the optical touch display apparatus according to the embodiments of the invention adopts the non-visible light guide module disposed between the light distribution adjustment device and the sensing space to provide the non-visible light, the exterior of the optical touch display apparatus is more even and good-looking.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An optical touch display apparatus, comprising:
    at least one visible light emitting device, capable of emitting a visible beam;
    a light distribution adjustment device, disposed beside the visible light emitting device in a transmission path of the visible beam;
    a non-visible light guide module, comprising:
        a light guide unit, disposed on the light distribution adjustment device in the transmission path of the visible beam from the light distribution adjustment device, and having a first surface facing away from the light distribution adjustment device, a second surface facing the light distribution adjustment device, and a side surface connecting the first surface and the second surface; and
        a dichroic unit, disposed on the light distribution adjustment device and between the light guide unit and the light distribution adjustment device;
    at least one non-visible light emitting device, disposed beside the side surface, and capable of emitting a non-visible beam, wherein the non-visible beam is capable of entering the light guide unit through the side surface, and the dichroic unit is capable of letting the visible beam pass through and reflecting the non-visible beam from the side surface to the first surface;

a display panel, disposed on the light guide unit, wherein a sensing space is located in front of the display panel, the display panel is disposed between the light guide unit and the sensing space, the light guide unit is disposed between the display panel and the dichroic unit, and the non-visible beam is capable of being transmitted to the sensing space through the first surface; and at least an optical detector, disposed outside the display panel, wherein a touch object reflects a portion of the non-visible beam when the touch object enters the sensing space, and the optical detector is disposed in a transmission path of the portion of the non-visible beam reflected by the touch object.

2. The optical touch display apparatus of claim 1, further comprising a processing unit, electrically connected to the optical detector, wherein a bright region is generated by the portion of the non-visible beam reflected by the touch object on a frame detected by the optical detector when the touch object enters the sensing space, and the processing unit determines a position of the touch object in the sensing space according to a position of the bright region of the frame.

3. The optical touch display apparatus of claim 1, wherein the non-visible light guide module is disposed between the light distribution adjustment device and the display panel.

4. The optical touch display apparatus of claim 1, wherein the non-visible light guide module is disposed between the display panel and the sensing space.

5. The optical touch display apparatus of claim 1, further comprising an optical film set, disposed between the light distribution adjustment device and the display panel, wherein the optical film set comprises at least one of a brightness enhancement film, a prism sheet, and a diffusion sheet.

6. The optical touch display apparatus of claim 5, wherein the non-visible light guide module is disposed between the optical film set and the display panel.

7. The optical touch display apparatus of claim 5, wherein the non-visible light guide module is disposed between the light distribution adjustment device and the optical film set.

8. The optical touch display apparatus of claim 1, wherein the optical detector is disposed beside the sensing space and disposed beside a side of the display panel facing away from the light distribution adjustment device.

9. The optical touch display apparatus of claim 8, further comprising a front frame, covering an edge of the display panel, wherein the optical detector is disposed on the front frame, and a portion of the front frame is disposed between the optical detector and the edge of the display panel.

10. The optical touch display apparatus of claim 1, wherein the optical detector is disposed beside a side of the display panel facing the light distribution adjustment device, and the portion of the non-visible beam reflected by the touch object is capable of being transmitted to the optical detector through the display panel.

11. The optical touch display apparatus of claim 1, wherein the light guide unit comprises a plurality of scattering microstructures, disposed on at least one of the first surface and the second surface.

12. The optical touch display apparatus of claim 11, wherein the scattering microstructures are dented dots, protruding dots, dented veins, protruding veins, or combinations thereof.

13. The optical touch display apparatus of claim 1, wherein the dichroic unit is a dichroic film or a dichroic mirror.

14. The optical touch display apparatus of claim 1, wherein the light distribution adjustment device is a light guide plate, the light guide plate has a third surface facing the display panel, a fourth surface facing away from the display panel, and a light incident surface connecting the third surface and the fourth surface, the visible light emitting device is disposed beside the light incident surface, and the visible beam is capable of entering the light guide plate through the light incident surface and being transmitted to the display panel through the first surface.

15. The optical touch display apparatus of claim 14, further comprising a reflecting unit, disposed on the fourth surface for reflecting the visible beam from the light incident surface to the first surface.

16. The optical touch display apparatus of claim 1, wherein the light distribution adjustment device is a diffusion plate, disposed between the visible light emitting device and the display panel.

17. The optical touch display apparatus of claim 1, wherein the display panel comprises:

an active device array substrate;

a liquid crystal layer, disposed between the active device array substrate and the sensing space;

an opposite substrate, disposed between the liquid crystal layer and the sensing space.

18. The optical touch display apparatus of claim 1, wherein the visible light emitting device is a visible light emitting diode, the non-visible light emitting device is an infrared light emitting diode, and the non-visible beam is an infrared beam.

19. The optical touch display apparatus of claim 1, wherein the optical detector is a complementary metal oxide semiconductor sensor, a charge coupled device, or a photo multiplier tube.

* * * * *